United States Patent
Lee et al.

(10) Patent No.: US 9,644,513 B2
(45) Date of Patent: May 9, 2017

(54) METHOD OF REGENERATING LEAN NOX TRAP OF EXHAUST PURIFICATION SYSTEM PROVIDED WITH LEAN NOX TRAP AND SELECTIVE CATALYTIC REDUCTION CATALYST AND EXHAUST PURIFICATION SYSTEM

(71) Applicants: HYUNDAI MOTOR COMPANY, Seoul (KR); FEV GMBH, Aachen (DE)

(72) Inventors: Jin Ha Lee, Seoul (KR); Jin Woo Park, Suwon-si (KR); Alexander Vovk, Aachen (DE); Joschka Schaub, Aachen (DE); Thomas Wittka, Aachen (DE)

(73) Assignees: Hyundai Motor Company, Seoul (KR); FEV GMBH, Aachen (DE)

( * ) Notice: Subject to any disclaimer, the term of this patent is extended or adjusted under 35 U.S.C. 154(b) by 0 days.

(21) Appl. No.: 14/955,911

(22) Filed: Dec. 1, 2015

(65) Prior Publication Data

US 2016/0376962 A1    Dec. 29, 2016

(30) Foreign Application Priority Data

Jun. 25, 2015 (KR) .................. 10-2015-0090767

(51) Int. Cl.
*F01N 3/00* (2006.01)
*F01N 3/08* (2006.01)
(Continued)

(52) U.S. Cl.
CPC ......... *F01N 3/0885* (2013.01); *F01N 3/0814* (2013.01); *F01N 3/0842* (2013.01);
(Continued)

(58) Field of Classification Search
CPC .... F01N 3/0885; F01N 3/2066; F01N 3/0814; F02D 41/0275
(Continued)

(56) References Cited

U.S. PATENT DOCUMENTS 8,037,674 B2 * 10/2011 Kupe ................. B01D 53/9431
60/286
2005/0103000 A1 * 5/2005 Nieuwstadt ............. F01N 3/035
60/286
(Continued)

FOREIGN PATENT DOCUMENTS

EP            2 455 599 A2    5/2012
KR    10-2010-0064918 A      6/2010
(Continued)

OTHER PUBLICATIONS

Extended European search report dated Nov. 25, 2016, for EP App. No. 15198186.7, 4 pages.

*Primary Examiner* — Jason Shanske
(74) *Attorney, Agent, or Firm* — Brinks Gilson & Lione (57) ABSTRACT

A method of regenerating a lean NOx trap (LNT) of an exhaust purification system provided with the LNT and a selective catalytic reduction (SCR) catalyst may include: determining whether a regeneration release condition of the LNT is satisfied; determining whether a regeneration demand condition of the LNT is satisfied; and performing regeneration of the LNT if the regeneration release condition of the LNT and the regeneration demand condition of the LNT are satisfied. In particular, the regeneration demand condition of the LNT is satisfied if a NOx adsorption in the LNT is larger than or equal to a threshold NOx adsorption, and the threshold NOx adsorption is set to a minimum value of a target NOx adsorption in the LNT which changes according to a maximum NOx adsorption in the LNT in cold (Continued)

starting and a NOx purification efficiency of the SCR catalyst.

20 Claims, 7 Drawing Sheets

(51) Int. Cl.
*F01N 3/20* (2006.01)
*F02D 41/02* (2006.01)

(52) U.S. Cl.
CPC ....... *F01N 3/2066* (2013.01); *F02D 41/0275* (2013.01); *F01N 2900/08* (2013.01); *F01N 2900/1614* (2013.01); *F01N 2900/1806* (2013.01)

(58) Field of Classification Search
USPC .......................................................... 60/274
See application file for complete search history.

(56) References Cited

U.S. PATENT DOCUMENTS

| | | | |
|---|---|---|---|
| 2012/0124970 A1* | 5/2012 | Lee | .................. F01N 13/009 60/286 |
| 2015/0143798 A1* | 5/2015 | Lee | .................. F02D 41/1446 60/274 |
| 2015/0143799 A1* | 5/2015 | Lee | .................. F01N 9/002 60/274 |

FOREIGN PATENT DOCUMENTS

| | | |
|---|---|---|
| KR | 10-0986073 B1 | 10/2010 |
| KR | 10-1048112 B1 | 7/2011 |
| WO | 2004/071646 A2 | 8/2004 |

* cited by examiner

METHOD OF REGENERATING LEAN NOX TRAP OF EXHAUST PURIFICATION SYSTEM PROVIDED WITH LEAN NOX TRAP AND SELECTIVE CATALYTIC REDUCTION CATALYST AND EXHAUST PURIFICATION SYSTEM

CROSS-REFERENCE TO RELATED APPLICATION

This application claims priority to and the benefit of Korean Patent Application No. 10-2015-0090767, filed on Jun. 25, 2015, the entire contents of which are incorporated herein by reference.

FIELD

The present disclosure relates to a method of regenerating of a lean NOx trap (LNT) of an exhaust purification system provided with the LNT and a selective catalytic reduction (SCR) catalyst and the exhaust purification system.

BACKGROUND

The statements in this section merely provide background information related to the present disclosure and may not constitute prior art.

Generally, exhaust gas flowing out from an engine through an exhaust manifold is driven into a catalytic converter mounted at an exhaust pipe and is purified therein. After that, the noise of the exhaust gas is decreased while passing through a muffler and then the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) is one type of such a catalytic converter and purifies nitrogen oxide (NOx) contained in the exhaust gas. If reducing agents such as urea, ammonia, carbon monoxide, and hydrocarbon (HC) are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst adsorbs the NOx contained in the exhaust gas when air/fuel ratio is lean, and releases the adsorbed NOx and reduces the released nitrogen oxide and the nitrogen oxide contained in the exhaust gas when the air/fuel ratio is rich atmosphere (hereinafter, it will be called a 'regeneration of the LNT').

Since general diesel engines are operated at the lean air/fuel ratio, however, it is required to artificially adjust air/fuel ratio to be the rich air/fuel ratio in order to release the adsorbed NOx from the LNT. For this purpose, a timing for releasing the NOx adsorbed in the LNT (i.e., regeneration timing). Particularly, the timing where the NOx adsorbed in the LNT can be released should be precisely determined to improve purification efficiency of the NOx and fuel economy and to inhibit degradation of the LNT.

The above information disclosed in this Background section is only for enhancement of understanding of the present disclosure and therefore it may contain information that is not already known to a person of ordinary skill in the art.

SUMMARY

The present disclosure provides a method of regenerating of a lean NOx trap (LNT) of an exhaust purification system provided with the LNT and a selective catalytic reduction (SCR) catalyst and the exhaust purification system having advantages of improving NOx purification efficiency and fuel economy by precisely determining a regeneration start timing and a regeneration end timing of the LNT.

A method of regenerating a lean NOx trap (LNT) of an exhaust purification system provided with the LNT and a selective catalytic reduction (SCR) catalyst according to an embodiment of the present disclosure may include: determining whether a regeneration release condition of the LNT is satisfied; determining whether a regeneration demand condition of the LNT is satisfied; and performing regeneration of the LNT if the regeneration release condition of the LNT and the regeneration demand condition of the LNT are satisfied, wherein the regeneration demand condition of the LNT is satisfied if a NOx adsorption in the LNT is larger than or equal to a threshold NOx adsorption, and wherein the threshold NOx adsorption is set to a minimum value of a target NOx adsorption in the LNT which changes according to a maximum NOx adsorption in the LNT in cold starting and a NOx purification efficiency of the SCR catalyst.

The maximum NOx adsorption in the LNT in cold starting may be calculated according to an NH3 adsorption in the SCR catalyst and an aging factor of the LNT.

The target NOx adsorption in the LNT may be calculated based on a target NOx adsorption ratio of the LNT according to an average temperature of the LNT and the NOx purification efficiency of the SCR catalyst, and an effective volume of the LNT according to an aging factor of the LNT.

The target NOx adsorption in the LNT may be firstly corrected according to a ratio of a target NH3 adsorption in the SCR catalyst and an NH3 adsorption in the SCR catalyst, and may be secondly corrected according to a ratio of a NOx exhaust per unit distance and a target NOx exhaust per unit distance at a downstream of the SCR catalyst.

The NOx exhaust per unit distance at the downstream of the SCR catalyst may be calculated according to a NOx mass flow at the downstream of the SCR catalyst and a travel distance of a vehicle.

The method further include: determining whether a regeneration reset condition is satisfied; and terminating the regeneration of the LNT if the regeneration reset condition is satisfied, wherein the regeneration reset condition is satisfied if first and second oxygen sensors mounted respectively at an upstream and a downstream of the LNT are synchronized or the NOx adsorption in the LNT is smaller than or equal to the target NOx adsorption in the LNT.

The target NOx adsorption in the LNT may be calculated according to the NOx purification efficiency of the SCR catalyst and the average temperature of the LNT.

The method further include: determining whether a regeneration reset condition is satisfied; and terminating the regeneration of the LNT if the regeneration reset condition is satisfied, wherein the regeneration reset condition is satisfied if a regeneration signal of the LNT is output, an engine is operated at a normal mode for a predetermined period, a ratio of the NOx adsorption in the LNT to the threshold NOx adsorption in the LNT is smaller than a predetermined adsorption ratio, and a predicted regeneration period is shorter than a minimum period.

The predicted regeneration period may be calculated according to a sum of a mass of reductant reacting with NOx in the LNT and a mass of reductant reacting with O2 in the LNT, and a mass flow of reductant.

The minimum period may be calculated based on a vehicle speed and the average temperature of the LNT.

An exhaust purification system according to another embodiment of the present disclosure may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using reductant including carbon or hydrogen contained in the exhaust gas; a dosing module mounted at the exhaust pipe downstream of the LNT and configured to directly inject reducing agent into the exhaust gas; a selective catalytic reduction (SCR) catalyst mounted at the exhaust pipe downstream of the dosing module and configured to reduce the NOx contained in the exhaust gas by using the reducing agent injected by the dosing module; and a controller configured to perform denitrification (DeNOx) by using the LNT and/or the SCR catalyst according to a driving condition of the engine, wherein the controller performs regeneration of the LNT if both of a regeneration demand condition of the LNT and a regeneration release condition of the LNT are satisfied, the regeneration demand condition of the LNT is satisfied if a NOx adsorption in the LNT is larger than or equal to a threshold NOx adsorption, and the threshold NOx adsorption is set to a minimum value of a target NOx adsorption in the LNT which changes according to a maximum NOx adsorption in the LNT in cold starting and a NOx purification efficiency of the SCR catalyst.

The controller may calculate the maximum NOx adsorption in the LNT in cold starting according to an NH3 adsorption in the SCR catalyst and an aging factor of the LNT.

The controller may calculate the target NOx adsorption in the LNT based on a target NOx adsorption ratio of the LNT according to an average temperature of the LNT and the NOx purification efficiency of the SCR catalyst, and an effective volume of the LNT according to an aging factor of the LNT.

The controller may firstly correct the target NOx adsorption in the LNT according to a ratio of a target NH3 adsorption in the SCR catalyst and an NH3 adsorption in the SCR catalyst, and may secondly correct the target NOx adsorption in the LNT according to a ratio of a NOx exhaust per unit distance and a target NOx exhaust per unit distance at a downstream of the SCR catalyst.

The controller may calculate the NOx exhaust per unit distance at the downstream of the SCR catalyst according to a NOx mass flow at the downstream of the SCR catalyst and a travel distance of a vehicle.

The controller may further determine whether a regeneration reset condition is satisfied and may terminate the regeneration of the LNT if the regeneration reset condition is satisfied, wherein the regeneration reset condition is satisfied if first and second oxygen sensors mounted respectively at an upstream and a downstream of the LNT are synchronized or the NOx adsorption in the LNT is smaller than or equal to the target NOx adsorption in the LNT.

The controller may calculate the target NOx adsorption in the LNT according to the NOx purification efficiency of the SCR catalyst and the average temperature of the LNT.

The controller may further determine whether a regeneration reset condition is satisfied and may terminate the regeneration of the LNT if the regeneration reset condition is satisfied, wherein the regeneration reset condition is satisfied if a regeneration signal of the LNT is output, an engine is operated at a normal mode for a predetermined period, a ratio of the NOx adsorption in the LNT to the threshold NOx adsorption in the LNT is smaller than a predetermined adsorption ratio, and a predicted regeneration period is shorter than a minimum period.

The controller may calculate the predicted regeneration period according to a sum of a mass of reductant reacting with NOx in the LNT and a mass of reductant reacting with O2 in the LNT, and a mass flow of reductant.

The controller may calculate the minimum period based on a vehicle speed and the average temperature of the LNT.

As described above, purification efficiency of the NOx may be improved and degradation of the LNT may be inhibited by precisely determining a regeneration start timing and a regeneration end timing of the LNT.

In addition, fuel economy may be improved by inhibiting unnecessary regeneration of the LNT.

Further, purification efficiency of the NOx may be further improved by changing the regeneration timing of the LNT according to purification efficiency of the SCR catalyst.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
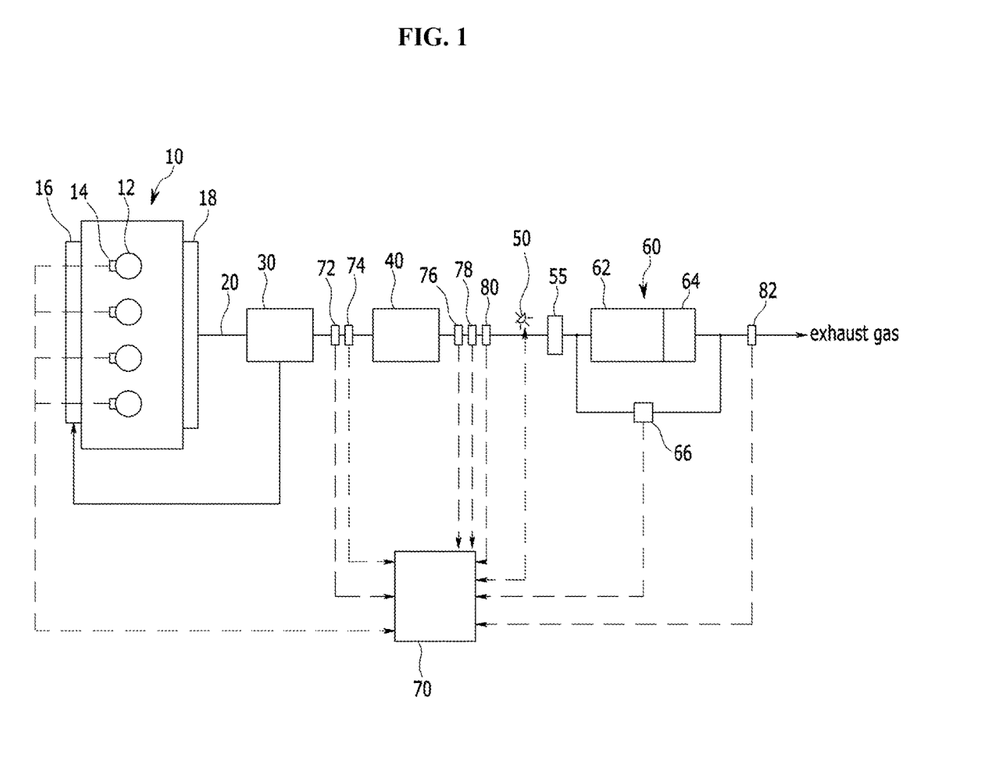
FIG. 1 is a schematic diagram of an exhaust purification system.

As shown in FIG. 1, an exhaust system for an internal combustion engine includes an engine 10, an exhaust pipe 20, an exhaust gas recirculation (EGR) apparatus 30, a lean NOx trap (LNT) 40, a dosing module 50, a particulate filter 60, and a controller 70. In addition, a turbo charger (not shown) may be mounted at the exhaust pipe 20. The turbo charger increases an intake air amount by using energy of an exhaust gas.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that the exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbon, carbon monoxide, particulate matter, and nitrogen oxide (NOx) contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 so as to control combustion temperature by mixing a portion of the exhaust gas with the air. Such control of the combustion temperature is performed by controlling amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor (or a first lambda sensor) 72 is mounted on the exhaust pipe 20 downstream of the exhaust gas recirculation apparatus 30. The first oxygen sensor 72 detects oxygen amount in the exhaust gas passing through the exhaust gas recirculation apparatus 30 and transmits a signal corresponding thereto to the controller 70 so as to help lean/rich control of the exhaust gas performed by the controller 70. In this specification, the detected value by the first oxygen sensor 72 is called a lambda at an upstream of the LNT (upstream lambda).

In addition, a first temperature sensor 74 is mounted on the exhaust pipe 20 downstream of the exhaust gas recirculation apparatus 30 and detects temperature of the exhaust gas passing through the exhaust gas recirculation apparatus 30.

The LNT 40 is mounted on the exhaust pipe 20 downstream of the exhaust gas recirculation apparatus 30. The LNT 40 adsorbs the nitrogen oxide (NOx) contained in the exhaust gas at a lean air/fuel ratio, and releases the adsorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbon (HC) contained in the exhaust gas.

Herein, the hydrocarbon represents all compounds consisting of carbon and hydrogen contained in the exhaust gas and the fuel.

A second oxygen sensor 76, a second temperature sensor 78, and a first NOx sensor 80 are mounted on the exhaust pipe 20 downstream of the LNT 40.

The second oxygen sensor (or a second lambda sensor) 76 detects oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called a lambda at a downstream of the LNT (downstream lambda).

The second temperature sensor 78 detects temperature of the exhaust gas flowing into the particulate filter 60 and transmits a signal corresponding thereto to the controller 70.

The first NOx sensor 80 detects NOx concentration contained in the exhaust gas flowing into the particulate filter 60 and transmits a signal corresponding thereto to the controller 70. The NOx concentration detected by the first NOx sensor 80 may be used to determine amount of reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia.

A mixer 55 is mounted on the exhaust pipe 20 downstream of the dosing module 50 and mixes the reducing agent and the exhaust gas evenly.

The particulate filter 60 is mounted on the exhaust pipe downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction (SCR) catalyst 64, but is not limited thereto.

It is to be understood that an SCR catalyst in this specification and claims, unless otherwise described, includes the SCR catalyst itself or the SDPF.

The SDPF 62 is formed by coating the SCR on walls defining channels of the DPF. Generally, the DPF includes a plurality of inlet channels and outlet channels. Each of the inlet channels includes an end that is open and the other end that is blocked, and receives the exhaust gas from a front end of the DPF. In addition, each of the outlet channels includes an end that is blocked and the other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR catalyst coated on the SDPF 62 reduces the nitrogen oxide contained in the exhaust gas using the reducing agent injected by the dosing module 50.

The additional SCR catalyst 64 is mounted at the rear of the SDPF 62. The additional SCR catalyst 64 further reduces the nitrogen oxide which is not purified by the SDPF 62. The additional SCR catalyst 64 may be mounted physically apart from the SDPF 62.

Meanwhile, a pressure difference sensor 66 is mounted on the exhaust pipe 20. The pressure difference sensor 66 detects pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than predetermined pressure. In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects concentration of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate performance of the particulate filter 60.

The controller 70 determines a driving condition of the engine based on the signals transmitted from each sensor, and performs the leans/rich control and controls the amount of the reducing agent injected by the dosing module 50 based on the driving condition of the engine. For example, the controller 70 may release the NOx from the LNT 40 by controlling the air/fuel ratio to be rich atmosphere and may reduce the released NOx by using reductant contained in the exhaust gas (in this specification, it will be called the 'regeneration of the LNT'). In addition, the controller 70 may remove the NOx at the SDPF 60 by injecting reducing agent. The lean/rich control may be performed by controlling fuel amount injected by the injector 14.

The controller 70 is provided with a plurality of maps, characteristics of the LNT, and correction coefficients, and may determine regeneration start timing and regeneration end timing based thereon. The plurality of maps, characteristics of the LNT, and correction coefficients may be set through a number of experiments.

In addition, the controller 70 controls regeneration of the particulate filter 60 and desulfurization of the LNT 40.

For these purposes, the controller 70 may include one or more processors activated by a predetermined program, and the predetermined program can be programmed to perform each step of a method of regenerating the LNT.

Figure 2:
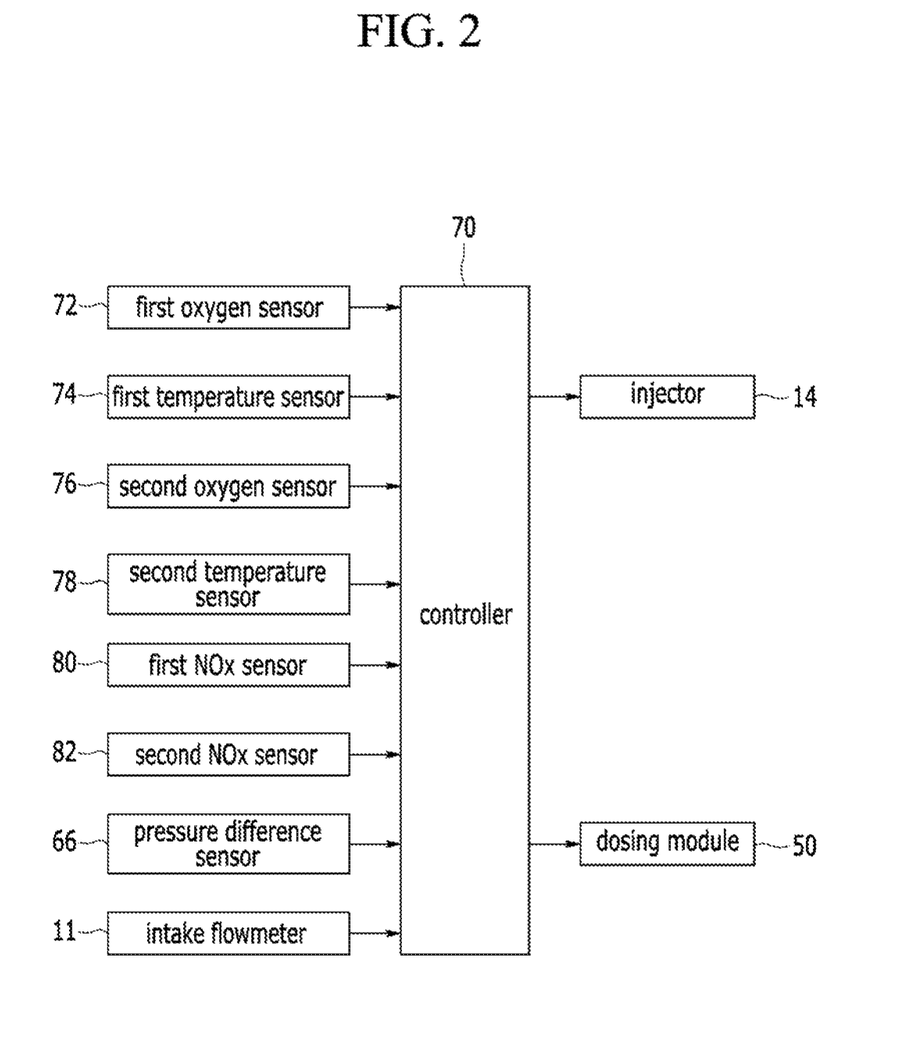
FIG. 2 is a block diagram illustrating relationship of an input and output of a controller used in a method of regenerating an LNT of an exhaust purification system.

FIG. 2 is a block diagram illustrating relationship of an input and output of a controller used in a method of regenerating an LNT of an exhaust purification system.

As shown in FIG. 2, the first oxygen sensor 72, the first temperature sensor 74, the second oxygen sensor 76, the second temperature sensor 78, the first NOx sensor 80, the second NOx sensor 82, the pressure difference sensor 66 and an intake flowmeter 11 are electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as the upstream lambda. The lambda means a ratio of actual air/fuel ratio to stoichiometric air/fuel ratio. If the lambda is greater than 1, the air/fuel ratio is lean. On the contrary, the air/fuel ratio is rich if the lambda is smaller than 1.

The first temperature sensor 74 detects the temperature of the exhaust gas passing through the exhaust gas recirculation apparatus 30 and transmits the signal corresponding thereto to the controller 70.

The second oxygen sensor 76 detects the oxygen amount in the exhaust gas flowing into the particulate filter 60 and transmits the signal corresponding thereto to the controller 70. The detected value by the second oxygen sensor 76 may be represented as the downstream lambda.

The second temperature sensor 78 detects the temperature of the exhaust gas flowing into the particulate filter 60 and transmits the signal corresponding thereto to the controller 70.

The first NOx sensor 80 detects the NOx concentration contained in the exhaust gas flowing into the particulate filter 60 and transmits the signal corresponding thereto to the controller 70.

The second NOx sensor 82 detects the NOx concentration contained in the exhaust gas exhausted from the particulate filter 60 and transmits the signal corresponding thereto to the controller 70.

The pressure difference sensor 66 detects the pressure difference between a front end portion and a rear end portion of the particulate filter 60 and transmits the signal corresponding thereto to the controller 70.

The intake flowmeter 11 detects an intake air flow supplied to an intake system of the engine 10 and transmits the signal corresponding thereto to the controller 70.

The controller 70 determines the driving condition of the engine, fuel injection amount, fuel injection timing, fuel injection pattern, injection amount of the reducing agent, regeneration timing of the particulate filter 60, and desulfurization/regeneration timing of the LNT 40 based on the transmitted value, and outputs a signal for controlling the injector 14 and the dosing module 50 to the injector 14 and the dosing module 50. In addition, the controller 70 may determine the regeneration start timing and the regeneration end timing of the LNT 40 based on the transmitted values.

Meanwhile, a plurality of sensors other than the sensors illustrated in FIG. 2 may be mounted in the exhaust purification device. For better comprehension and ease of description, however, description of the plurality of sensors will be omitted.

FIG. 3 to FIG. 7 are flowcharts of a method of regenerating the LNT according to an embodiment of the present disclosure.

Figure 3:
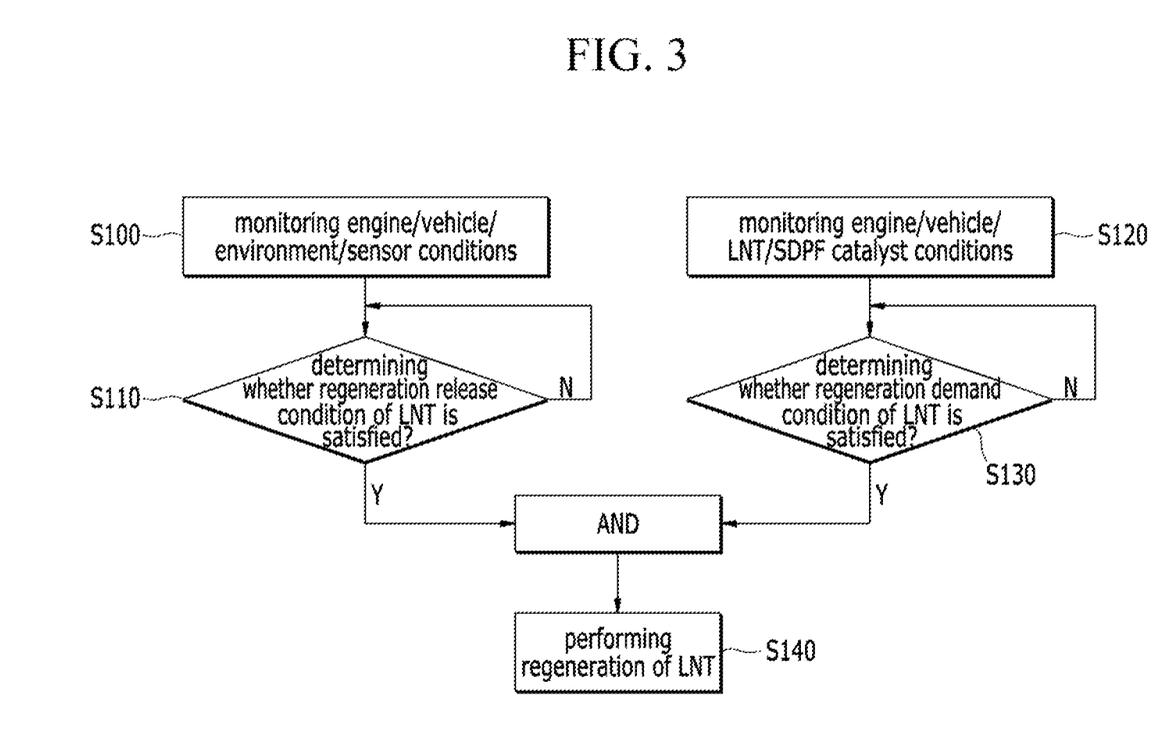
FIG. 3 is a flowchart of a method of regenerating an LNT.

As shown in FIG. 3, the controller 70 and various sensors monitor engine/vehicle/environment/sensor conditions at step S100, and the controller 70 determines whether the engine/vehicle/environment/sensor conditions satisfy a regeneration release condition of the LNT at step S110 in the method of regenerating the LNT. In addition, the controller 70 and various sensors monitor engine/vehicle/LNT/SCR catalyst at step S120, and the controller 70 determines whether states of the engine/vehicle/LNT/SCR catalyst satisfy a regeneration demand condition of the LNT at step S130. After that, the controller 70 performs the regeneration of the LNT 40 at step S140 if both of the regeneration release condition of the LNT and the regeneration demand condition of the LNT are satisfied. If neither of the regeneration release condition of the LNT and the regeneration demand condition of the LNT is satisfied, the controller 70 may not perform the regeneration of the LNT 40 and continuously checks whether non-satisfied condition is satisfied.

Figure 4:
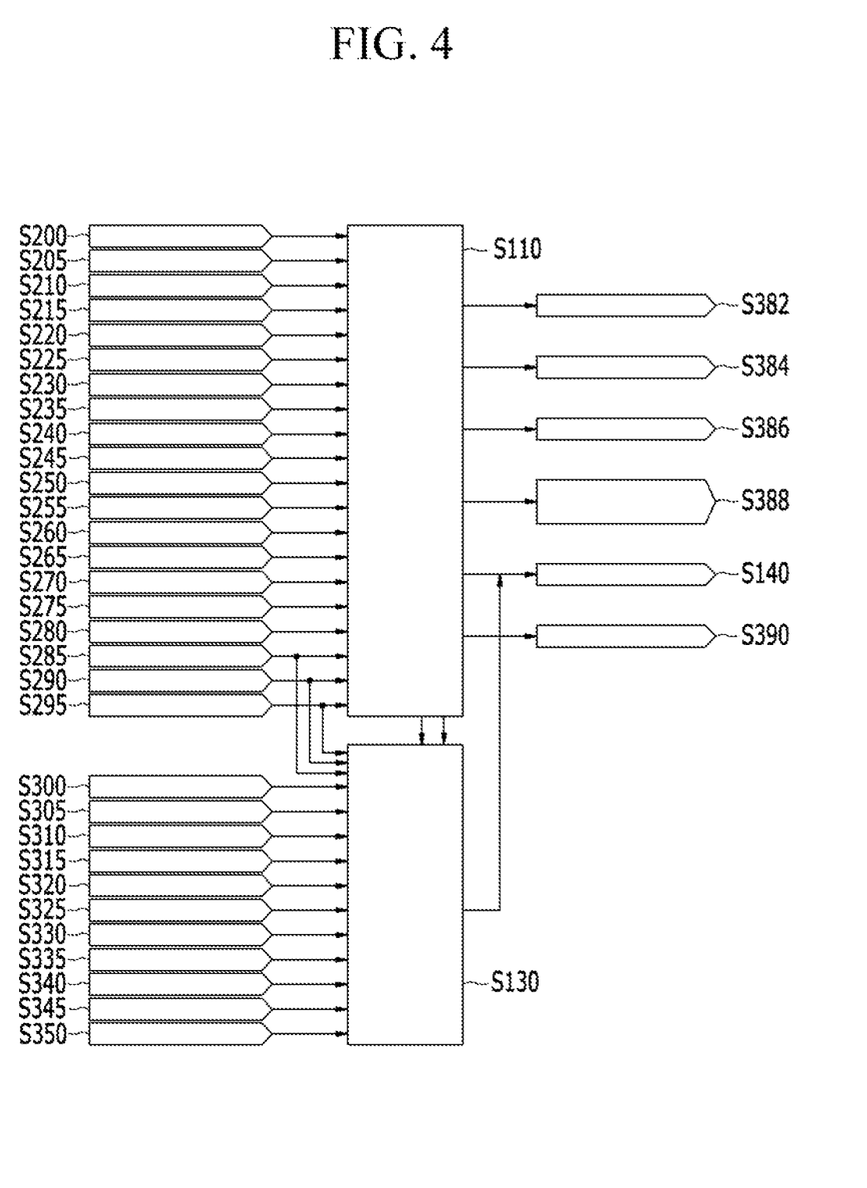
FIG. 4 illustrates a flowchart in FIG. 3 in further detail.

Referring to FIG. 4, the method of regenerating the LNT will be described in further detail.

As shown in FIG. 4, the method of regenerating the LNT begins with detecting or calculating various data. That is, the controller 70 detects or calculates a mass flow of the exhaust gas passing through the LNT 40 at step S200, detects or calculates a NOx concentration at the upstream of the LNT 40 at step S205, detects or calculates a NOx concentration at the downstream of the LNT 40 at step S210, detects or calculates a temperature at an upstream of the turbo charger (hereinafter, it will be called an 'upstream turbo temperature') at step S215, detects or calculates a fuel temperature at step S220, and detects or calculates an engine torque at step S225. Herein, a mass flow means a mass per unit time. The mass is calculated by integrating the mass flow over a time. In addition, that the controller 70 detects data includes a sensor electrically connected to the controller 70 detects the data.

The mass flow of the exhaust gas passing through the LNT 40 may be calculated from the intake air flow detected by the intake flowmeter 11 and an EGR amount or may be detected by an additional sensor, the NOx concentration at the upstream of the LNT 40 may be calculated from a NOx mass generated according to the driving condition of the engine and a mass of the exhaust gas or may be detected by an additional sensor, and the NOx concentration at the downstream of the LNT 40 may be calculated from a NOx concentration at the upstream of the LNT 40 and a state of the LNT 40 or may be detected by the first NOx sensor 80. The temperature at the upstream of the turbo charger may be calculated from the driving condition of the engine or from the temperature of the exhaust gas detected by the first temperature sensor 74, the fuel temperature may be detected by a temperature sensor mounted in a fuel tank or on a fuel supply line, and the engine torque may be calculated from the driving condition of the engine.

In addition, the controller 70 detects a battery voltage at step S230, detects a coolant temperature at step S235, detects a state of the first oxygen sensor 72 and a state of the second oxygen sensor 76 at steps S240 and S245, detects an engine speed at step S250, and detects a currently engaged gear stage at step S255. Herein, a state of a sensor indicates the sensor is activated. If the sensor is activated, the state of the sensor may be a value of "True" or "1". However, if the sensor is not activated, the state of the sensor may be a value of "False" or "0".

In addition, the controller 70 detects or calculates the upstream lambda and the downstream lambda at steps S260 and S265, detects or calculates the temperature of the exhaust gas at the upstream of the LNT 40 and the temperature of the exhaust gas at the downstream of the LNT 40 at steps S270 and S275, calculates a NOx adsorption ratio of the LNT 40 at step S280, detects an engine operation mode at step S285, calculates a NOx mass adsorbed in the LNT 40 (NOx adsorption in the LNT 40) at step S290, and calculates an average temperature of the LNT 40 at step S295. That is, the upstream lambda and the downstream lambda may be detected by the first oxygen sensor 72 and the second oxygen sensor 76 or may be calculated based on a driving condition of the engine and the state of the LNT 40 by the controller 70. The temperature of the exhaust gas at the upstream of the LNT 40 and the temperature of the exhaust gas at the downstream of the LNT 40 may be detected by the first and second temperature sensors 74 and 78 or may calculated based on the driving condition of the engine by the controller 70. The NOx adsorption ratio of the LNT 40 may be calculated from a maximum NOx adsorption in the LNT 40 (maximum NOx mass adsorbed in the LNT 40) and an actual NOx adsorption in the LNT 40 (actual NOx mass adsorbed in the LNT 40) calculated based on the driving condition of the engine and the state of the LNT 40 by the controller 70, and the average temperature of the LNT 40 may be calculated from the temperature of the exhaust gas at the upstream of the LNT 40 and the temperature of the exhaust gas at the downstream of the LNT 40 by the controller 70.

Meanwhile, the engine operation mode includes a normal mode, an LNT regeneration mode, an LNT desulfurization mode, an SDPF regeneration mode, and so on. The normal mode is a mode that is not the LNT regeneration mode, the LNT desulfurization mode, and the SDPF regeneration mode.

In addition, the controller 70 detects a vehicle speed at step S300, calculates an aging factor of the LNT 40 at step S305, detects a travel distance of the vehicle at step S310, detects a mass flow of air supplied to the engine 10 when regeneration (i.e., at rich air/fuel ratio) at step S315, calculates a target lambda when regeneration at step S320, and calculates an O2 mass adsorbed in the LNT 40 (O2 adsorption in the LNT 40) at step S325. Herein, the aging factor of the LNT 40 may be calculated according to a use period of the LNT 40, the mass flow of the air supplied to the engine 10 when regeneration may be detected by the intake flowmeter 11 when regeneration, the target lambda when regeneration may be determined according to the driving condition of the engine, the state of the LNT 40 and a state of the SDPF 60, and the O2 mass adsorbed in the LNT 40 may be calculated based on the temperature of the LNT 40, operating history of the engine after previous regeneration of the LNT 40, the aging factor of the LNT 40, and so on.

In addition, the controller 70 calculates a target NH3 adsorption in the SDPF 60 (target NH3 mass adsorbed in the SDPF 60) at step S330, calculates a NOx mass flow at the downstream of the SDPF 60 at step S335, detects a state of the second NOx sensor 82 at step S340, calculates a NH3 adsorption in the SDPF 60 (NH3 mass adsorbed in the SDPF 60) at step S345, and calculates a NOx purification efficiency of the SDPF 60 at step S350. Herein, the target NH3 adsorption in the SDPF 60 may be calculated from a predetermined map based on the temperature of the SDPF 60, a lambda at the upstream of the SDPF, the NOx purification efficiency of the SDPF 60, and so on. The NOx mass flow at the downstream of the SDPF 60 may be calculated based on the NOx concentration at the downstream of the SDPF 60 detected by the second NOx sensor 82, the NH3 adsorption in the SDPF 60 may be calculated based on the temperature of the SDPF 60, the lambda at the upstream of the SDPF, and injection history of the reducing agent by the dosing module 50, and the NOx purification efficiency of the SDPF 60 may be calculated based on the temperature of the SDPF 60, the lambda at the upstream of the SDPF, and the NH3 adsorption in the SDPF 60.

If various data is detected or calculated, the controller 70 determines whether the regeneration release condition of the LNT is satisfied at the step S110 based on the mass flow of the exhaust gas passing through the LNT 40, the NOx concentration at the upstream of the LNT 40, the NOx concentration at the downstream of the LNT 40, the temperature at the upstream of the turbo charger, the fuel temperature, the engine torque, the battery voltage, the coolant temperature, the state of the first oxygen sensor 72, the state of the second oxygen sensor 76, the engine speed, the gear stage, the upstream lambda, the downstream lambda, the temperature of the exhaust gas at the upstream of the LNT 40, the temperature of the exhaust gas at the downstream of the LNT 40, the NOx adsorption ratio of the LNT 40, the NOx adsorption in the LNT 40, and the average temperature of the LNT 40. At this process, the controller 70 detects a temperature state at the upstream of the turbo charger at step S382, detects a gear stage state at step S384, detects a general NOx release condition state at step S386, outputs a reset signal of NOx and O2 adsorption due to lambda sensor synchronization at step S388, detecting whether the lambda sensor synchronization occurs at step S390, and detecting whether a lambda sensor synchronization demand switch is turned on at step S392 (see FIG. 5). The temperature state at the upstream of the turbo charger represents whether the temperature at the upstream of the turbo charger is within a predetermined range. That is, if the temperature at the upstream of the turbo charger is within the predetermined range, the temperature state at the upstream of the turbo charger may be a value of "True" or "1". On the contrary, if the temperature at the upstream of the turbo charger is not within the predetermined range, the temperature state at the upstream of the turbo charger may be a value of "False" or "0". Similarly, the gear stage state represents whether the gear stage is within a predetermined gear stage range, the general NOx release condition state represents whether current engine/environment/LNT conditions satisfy general conditions where the NOx can be released, and whether the lambda sensor synchronization occurs represents whether a difference between the lambda values detected respectively by the first and second oxygen sensors 72 and 76 is smaller than or equal to a predetermined value. In addition, if the reset signal of NOx and O2 adsorption is outputs, the controller 70 resets the NOx adsorption in the LNT 40 and the O2 adsorption in the LNT 40 (O2 mass adsorbed in the LNT 40) stored in a memory to 0 or a predetermined value. Furthermore, if the lambda sensor synchronization demand switch is turned on, the controller 70 performs various controls for synchronizing the lambda sensors.

In addition, the controller 70 determines whether the regeneration demand condition of the LNT is satisfied at the step S130 based on whether the lambda sensor synchronization occurs, whether the lambda sensor synchronization demand switch is turned on, the engine operation mode, the NOx adsorption in the LNT 40, the average temperature of the LNT 40, the vehicle speed, the aging factor of the LNT 40, the travel distance of the vehicle, the mass flow of the air supplied to the engine 10 when regeneration (i.e., at rich air/fuel ratio), the target lambda when regeneration, the O2 adsorption in the LNT 40, the target NH3 adsorption in the SDPF 60, the NOx mass flow at the downstream of the SDPF 60, the state of the second NOx sensor 82, the NH3 adsorption in the SDPF 60, the NOx purification efficiency of the SDPF 60, and so on.

After that, if the regeneration release condition of the LNT and the regeneration demand condition of the LNT are satisfied, the controller 70 outputs a regeneration signal and performs the regeneration of the LNT 40 at step 140.

Hereinafter, referring to FIG. 5, the step S130 in FIG. 4 will be described in detail.

Figure 5:
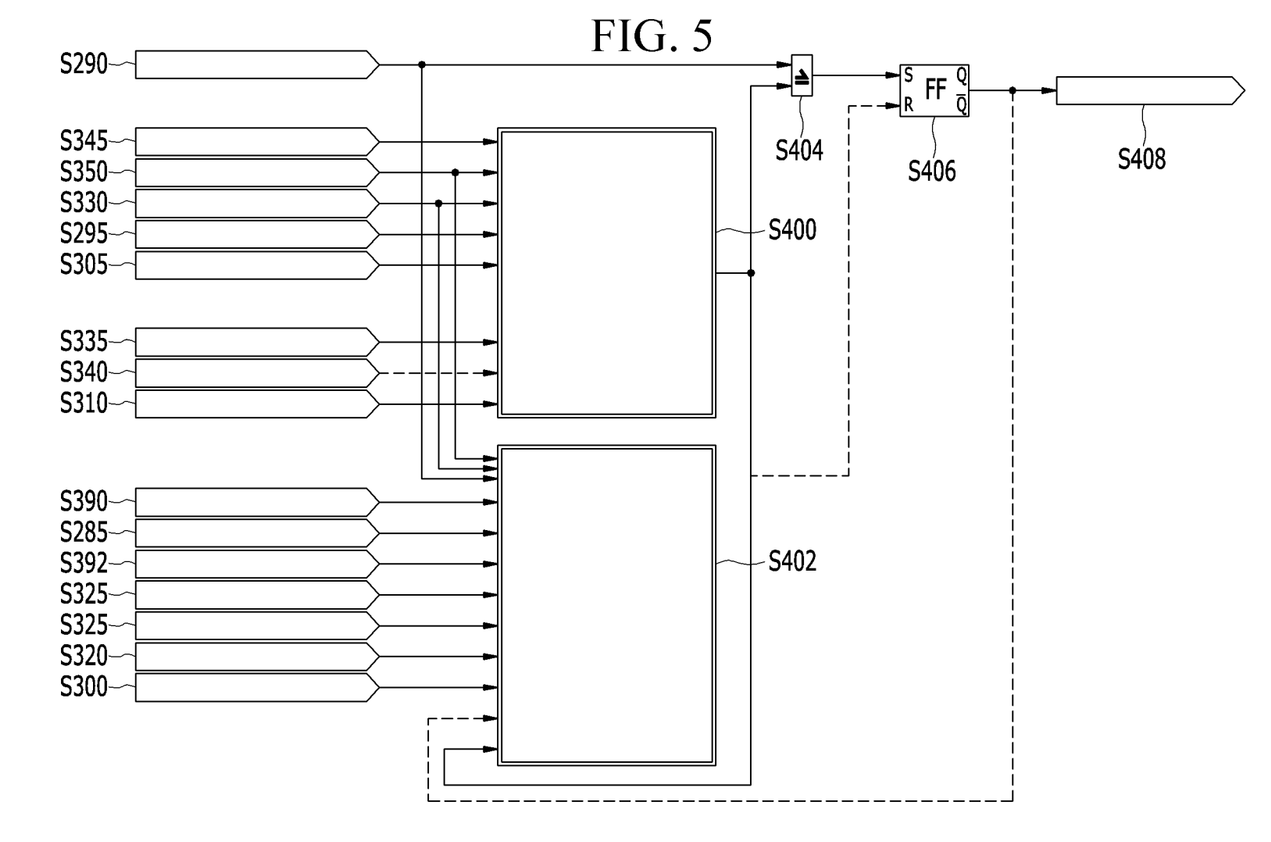
FIG. 5 illustrates step S130 in FIG. 4 in further detail.

Referring to FIG. 5, the step S130 includes calculating a threshold NOx adsorption in the LNT 40 (threshold NOx mass adsorbed in the LNT 40) at step S400 and determining whether a regeneration reset signal output condition is satisfied at step S402. That is, the controller 70 calculates the threshold NOx mass that can be adsorbed in the LNT 40 based on the various data at the step S400, determines whether the NOx adsorption in the LNT 40 is larger than or equal to the threshold NOx adsorption at step S404, and outputs a regeneration demand signal at step S408 if the NOx adsorption in the LNT 40 is larger than or equal to the threshold NOx adsorption. In addition, the controller 70 determines whether the regeneration reset signal output condition is satisfied based on the various data at the step S402, and outputs a regeneration reset signal if the regeneration reset signal output condition is satisfied. After that, the controller 70 inputs the regeneration demand signal and the regeneration reset signal into a flip flop at step S406. Therefore, the controller 70 outputs one of the regeneration demand signal or the regeneration reset signal.

In further detail, the controller 70 calculates the threshold NOx adsorption in the LNT 40 at the step S400 based on the NH3 adsorption in the SDPF 60, the NOx purification efficiency of the SDPF 60, the target NH3 adsorption in the SDPF 60, the average temperature of the LNT 40, the aging factor of the LNT 40, the NOx mass flow at the downstream of the SDPF 60, the state of the second NOx sensor 82, and the travel distance of the vehicle. Herein, the travel distance of the vehicle means a total distance that the vehicle travels after previous regeneration.

In addition, the controller 70 determines whether the regeneration reset signal output condition is satisfied at the step S402 based on the NOx adsorption in the LNT 40, the NOx purification efficiency of the SDPF 60, the target NH3 adsorption in the SDPF 60, whether the lambda sensor synchronization occurs, the engine operation mode, whether the lambda sensor synchronization demand switch is turned on, the O2 adsorption in the LNT 40, the target lambda when regeneration, the vehicle speed, the threshold NOx adsorption, and the regeneration demand signal.

Hereinafter, referring to FIG. 6, the step S400 in FIG. 5 will be described in further detail.

Figure 6:
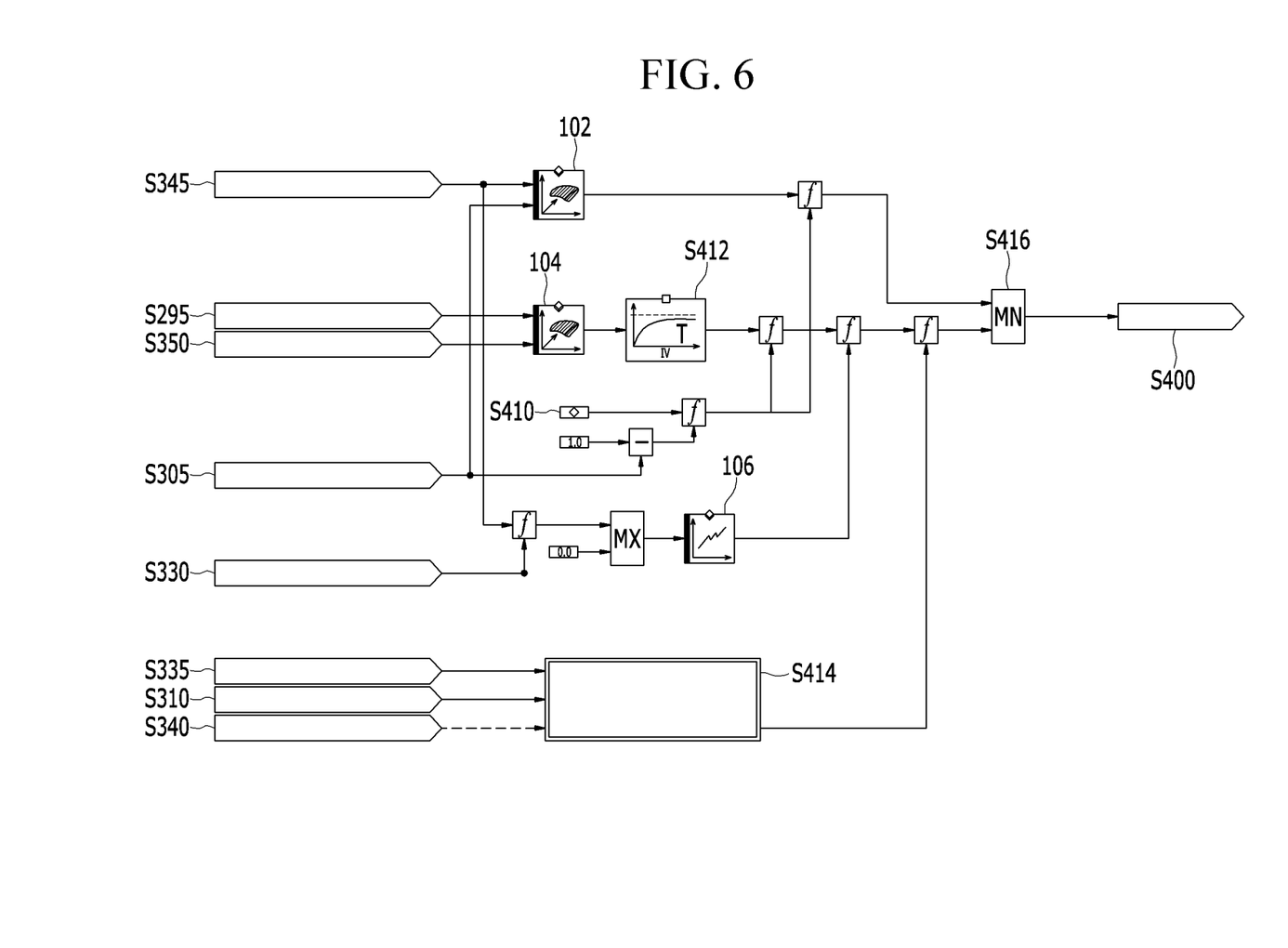
FIG. 6 illustrates step S400 in FIG. 5 in further detail.

As shown in FIG. 6, the controller 70 inputs the NH3 adsorption in the SDPF 60 and the aging factor of the LNT 40 into a predetermined map 102 so as to calculate a maximum NOx adsorption in the LNT 40 (maximum NOx mass that can be adsorbed in the LNT 40) in cold starting. In addition, the controller 70 inputs the average temperature of the LNT 40 and the NOx purification efficiency of the SDPF 60 into a predetermined map 104 so as to calculate a target NOx adsorption ratio of the LNT 40, and inputs the target NOx adsorption ratio of the LNT 40 into a low-pass filter at step S412. In addition, an effective volume of the LNT 40 is calculated from the aging factor of the LNT 40 and a volume of the LNT 40 (it is input at step S410), and the target NOx adsorption in the LNT 40 is calculated by multiplying the effective volume of the LNT 40 and the target NOx adsorption ratio of the LNT 40.

The controller 70 inputs a ratio of the target NH3 adsorption in the SDPF 60 and the NH3 adsorption in the SDPF 60 into a predetermined correction map 106 so as to calculate a first correction coefficient, and calculates a second correction coefficient at step S414 based on the NOx mass flow at the downstream of the SDPF 60, the state of the second NOx sensor 82, and the travel distance of the vehicle.

A method of calculating the second correction coefficient will be described in detail.

The controller 70 calculates a NOx exhaust per unit distance at the downstream of the SDPF 60. The NOx exhaust per unit distance at the downstream of the SDPF 60 is calculated from following equation.

$$m_s = \frac{\int_{t-\Delta t}^{t} \dot{m}\, dt}{\int_{t-\Delta t}^{t} v\, dt} = \frac{m(t) - m(t - \Delta t)}{s(t) - s(t - \Delta t)}$$

$$S_o = s(t) - s(t - \Delta t)$$

Herein, $m_s$ represents the NOx exhaust per unit distance at the downstream of the SDPF 60, rh represents the NOx mass flow at the downstream of the SDPF 60, v represents the vehicle speed, t represents a time, Δt represents a period corresponding to an average calculation distance, $S_0$ represents the average calculation distance, and s represents a distance. That is, the NOx exhaust per unit distance at the downstream of the SDPF 60 is calculated by integrating the NOx mass flow at the downstream of the SDPF 60 over the period corresponding to the average calculation distance.

In addition, m(t−Δt) is calculated from following equation.

$$m_{t-\Delta t}^{k} = m_{t-\Delta t}^{k-1} + \frac{m_t^k - m_{t-\Delta t}^{k-1}}{\Delta K}$$

$$\Delta K = \frac{s_{calc}}{S_o + s_{calc}}$$

Herein, m represents a NOx exhaust at the downstream of the SDPF 60 (NOx mass exhausted from the SDPF 60), k represents a current calculation period, ΔK represents a number of an average calculation period, and Scalc represents a calculation start distance.

After that, the controller divides the NOx exhaust per unit distance at the downstream of the SDPF 60 by a predetermined target NOx exhaust per unit distance at the downstream of the SDPF 60, and calculates the second correction coefficient by inputting a ratio of the NOx exhaust per unit distance at the downstream of the SDPF 60 and the target NOx exhaust per unit distance at the downstream of the SDPF 60 into a predetermined map.

After that, the controller 70 corrects the target NOx adsorption in the LNT 40 by using the first correction coefficient and the second correction coefficient. In addition, the controller 70 selects a minimum value of the maximum NOx adsorption in the LNT 40 in cold starting and the corrected target NOx adsorption in the LNT 40 at step S416, and outputs the minimum value as the threshold NOx adsorption in the LNT 40 at the step S400.

Hereinafter, referring to FIG. 7, the step S402 in FIG. 5 will be described in further detail.

Figure 7:
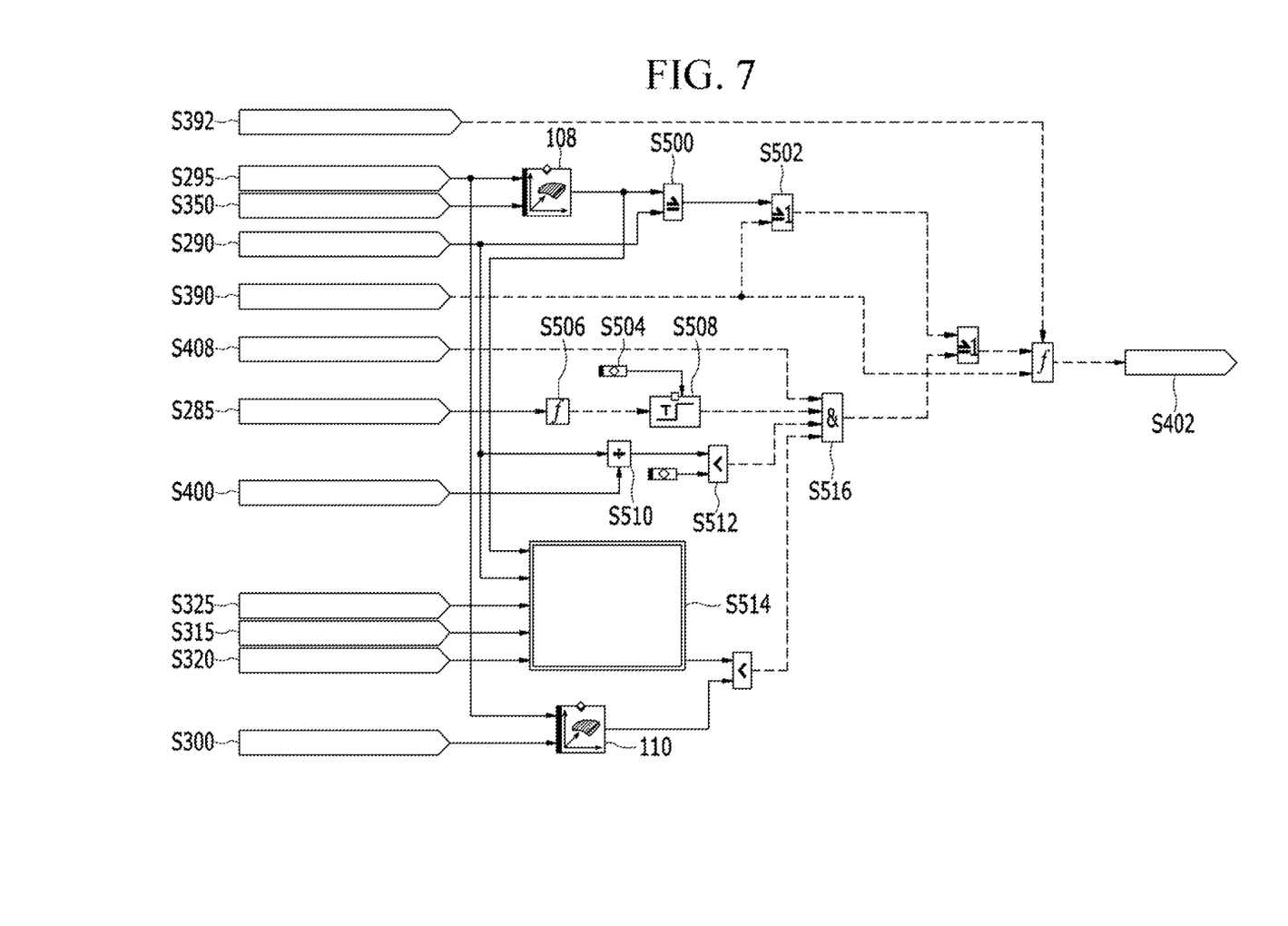
FIG. 7 illustrates step S402 in FIG. 5 in further detail.

As shown in FIG. 7, the controller 70 outputs the regeneration reset signal at the step S402 if the lambda sensors are synchronized or the lambda sensors are not synchronized and either of the first and second conditions is satisfied in a state that the lambda sensor synchronization demand switch is turned on.

The first condition is satisfied if the NOx adsorption in the LNT 40 is smaller than or equal to the target NOx adsorption in the LNT 40. For this purpose, the controller 70 calculates the target NOx adsorption in the LNT 40 by inputting the average temperature of the LNT 40 and the NOx purification efficiency of the SDPF 60 into a predetermined map 108. At this time, if the NOx purification efficiency of the SDPF 60 is high, the target NOx adsorption in the LNT 40 is increased so as to inhibit frequent regeneration of the LNT 40. After that, the controller 70 determines whether the NOx adsorption in the LNT 40 is smaller than or equal to the target NOx adsorption in the LNT 40 at step S500, and determines that the first condition is satisfied if the NOx adsorption in the LNT 40 is smaller than or equal to the target NOx adsorption in the LNT 40, or the lambda sensors are synchronized.

The second condition is satisfied if the regeneration signal of the LNT 40 is output at the step S408, the engine is operated at the normal mode for a predetermined period, a ratio of the NOx adsorption in the LNT 40 to the threshold NOx adsorption in the LNT 40 is smaller than a predetermined adsorption ratio, and the predicted regeneration period is shorter than a minimum period. That is, the controller 70 determines whether the four conditions are satisfied at step S516 and determines that the second condition is satisfied if the four conditions are satisfied.

These processes are described in further detail. In addition, since the step S408 is described above, description of the step S408 will be omitted.

The controller 70 determines whether the engine operation mode determined from the driving condition of the engine is the normal mode at step S506, and determines at step S508 whether the normal mode continues for the predetermined period input at step S504.

In addition, the controller 70 calculates the ratio of the NOx adsorption in the LNT 40 to the threshold NOx adsorption in the LNT 40 at step S510 by dividing the NOx adsorption in the LNT 40 by the threshold NOx adsorption in the LNT 40 calculated at the step S400, and compares the ratio with a predetermined adsorption ratio at step S512.

Further, the controller 70 calculates the minimum period by inputting the average temperature of the LNT 40 and the vehicle speed into a predetermined map 110, calculates a predicted regeneration period based on the target NOx adsorption in the LNT 40, the NOx adsorption in the LNT 40, the O2 adsorption in the LNT 40, the mass flow of the air supplied to the engine 10 when regeneration (i.e., at rich air/fuel ratio), the target lambda when regeneration, and determines whether the predicted regeneration period is shorter than the minimum period.

The predicted regeneration period is calculated from following equation. Herein, it is assumed that C3H6 represents all reductants besides NH3 as kind of substitute reductant (besides NH3) when regenerating the LNT 40. From a number of experiment results, it is confirmed that a suitable result is produced in the assumption that the C3H6 is used as kind of substitute reductant (besides NH3).

$$m_{C_3H_6,req} = M_{C_3H_6}\left(\frac{\Delta m_{NOx}}{M_{NOx}v_{NOx,HC}} + \frac{m_{O_2}}{M_{O_2}v_{O_2,HC}}\right)$$

$$\dot{m}_{C_3H_6} = \frac{\dot{m}_{Air,rich}}{L_{st}}\left(\frac{1}{\lambda_{trgt}} - 1\right)$$

$$\Delta t_{req} = \frac{m_{C_3H_6,req}}{\dot{m}_{C_3H_6}}$$

Herein, $m_{C_3H_6,req}$ is a required reductant mass, is a $\Delta m_{NOx}$ difference between the target NOx adsorption in the LNT 40 and the NOx adsorption in the LNT 40, $m_{O_2}$ is the O2 adsorption in the LNT 40, $M_{C_3H_6}$ is a molar mass of the reductant, $M_{NOx}$ is a molar mass of the NOx, $M_{O_2}$ is a molar mass of the O2, $v_{NOx,HC}$ is a stoichiometric coefficient of the NOx when reacting with the C3H6, $v_{O_2,HC}$ is a stoichiometric coefficient of the O2 when reacting with the C3H6, $\dot{m}_{C_3H_6}$ is a mass flow of the reductant at the upstream of the LNT is the mass flow of the air supplied into the engine 10 when regeneration, $L_{st}$ is the air/fuel ratio, $\lambda_{erge}$ is the target lambda when regeneration, and $\Delta t_{req}$ is the predicted regeneration period. That is, the controller 70 predicts the period that is required for regeneration by dividing the required reductant mass by the mass flow of the supplied reductant.

While this present disclosure has been described in connection with what is presently considered to be practical embodiments, it is to be understood that the present disclosure is not limited to the disclosed embodiments, but, on the contrary, is intended to cover various modifications and equivalent arrangements included within the spirit and scope of the appended claims.

What is claimed is:

1. A method of regenerating a lean NOx trap (LNT) of an exhaust purification system provided with the LNT and a selective catalytic reduction (SCR) catalyst, comprising:
   determining whether a regeneration release condition of the LNT is satisfied;
   determining whether a regeneration demand condition of the LNT is satisfied; and
   performing regeneration of the LNT when the regeneration release condition of the LNT and the regeneration demand condition of the LNT are satisfied,
   wherein the regeneration demand condition of the LNT is satisfied when a NOx adsorption in the LNT is larger than or equal to a threshold NOx adsorption, and
   wherein the threshold NOx adsorption is set to a minimum value of a target NOx adsorption in the LNT which changes according to a maximum NOx adsorption in the LNT in cold starting and a NOx purification efficiency of the SCR catalyst.

2. The method of claim 1, wherein the maximum NOx adsorption in the LNT in cold starting is calculated according to a NH3 adsorption in the SCR catalyst and an aging factor of the LNT.

3. The method of claim 1, wherein the target NOx adsorption in the LNT is calculated based on a target NOx adsorption ratio of the LNT according to an average temperature of the LNT and the NOx purification efficiency of the SCR catalyst, and an effective volume of the LNT according to an aging factor of the LNT.

4. The method of claim 3, wherein the target NOx adsorption in the LNT is firstly corrected according to a ratio of a target NH3 adsorption in the SCR catalyst and an NH3 adsorption in the SCR catalyst, and is secondly corrected according to a ratio of a NOx exhaust per unit distance and a target NOx exhaust per unit distance at a downstream of the SCR catalyst.

5. The method of claim 4, wherein the NOx exhaust per unit distance at the downstream of the SCR catalyst is calculated according to a NOx mass flow at the downstream of the SCR catalyst and a travel distance of a vehicle.

6. The method of claim 1, further comprising:
   determining whether a regeneration reset condition is satisfied; and
   terminating the regeneration of the LNT when the regeneration reset condition is satisfied,
   wherein the regeneration reset condition is satisfied when first and second oxygen sensors mounted respectively at an upstream and a downstream of the LNT are synchronized or the NOx adsorption in the LNT is smaller than or equal to the target NOx adsorption in the LNT.

7. The method of claim 6, wherein the target NOx adsorption in the LNT is calculated according to the NOx purification efficiency of the SCR catalyst and an average temperature of the LNT.

8. The method of claim 1, further comprising:
   determining whether a regeneration reset condition is satisfied; and
   terminating the regeneration of the LNT when the regeneration reset condition is satisfied,
   wherein the regeneration reset condition is satisfied when a regeneration signal of the LNT is output, an engine is operated at a normal mode for a predetermined period, a ratio of the NOx adsorption in the LNT to the threshold NOx adsorption in the LNT is smaller than a predetermined adsorption ratio, and a predicted regeneration period is shorter than a minimum period.

9. The method of claim 8, wherein the predicted regeneration period is calculated according to a sum of a mass of reductant reacting with NOx in the LNT and a mass of reductant reacting with O2 in the LNT, and a mass flow of reductant.

10. The method of claim 8, wherein the minimum period is calculated based on a vehicle speed and an average temperature of the LNT.

11. An exhaust purification system for an engine including an injector configured to inject fuel thereinto, the engine generating power by burning a mixture of air and the fuel, the engine exhausting an exhaust gas generated in a combustion process to an exterior thereof through an exhaust pipe, the exhaust purification system comprising:
   a lean NOx trap (LNT) mounted on the exhaust pipe, and configured to adsorb nitrogen oxide (NOx) contained in the exhaust gas at a lean air/fuel ratio, to release the adsorbed nitrogen oxide at a rich air/fuel ratio, and to reduce the nitrogen oxide contained in the exhaust gas or the released nitrogen oxide using a reductant including carbon or hydrogen contained in the exhaust gas;
   a dosing module mounted at the exhaust pipe downstream of the LNT and configured to directly inject a reducing agent into the exhaust gas;
   a selective catalytic reduction (SCR) catalyst mounted at the exhaust pipe downstream of the dosing module and configured to reduce the NOx contained in the exhaust gas by using the reducing agent injected by the dosing module; and
   a controller configured to perform denitrification (De-NOx) by using the LNT and/or the SCR catalyst according to a driving condition of the engine,
   wherein the controller is configured to perform regeneration of the LNT when both of a regeneration demand condition of the LNT and a regeneration release condition of the LNT are satisfied,
   the regeneration demand condition of the LNT being satisfied when a NOx adsorption in the LNT is larger than or equal to a threshold NOx adsorption, and
   the threshold NOx adsorption is set to a minimum value of a target NOx adsorption in the LNT which changes according to a maximum NOx adsorption in the LNT in cold starting and a NOx purification efficiency of the SCR catalyst.

12. The exhaust purification system of claim 11, wherein the controller is configured to calculate the maximum NOx adsorption in the LNT in cold starting according to an NH3 adsorption in the SCR catalyst and an aging factor of the LNT.

13. The exhaust purification system of claim 11, wherein the controller is configured to calculate the target NOx adsorption in the LNT based on a target NOx adsorption ratio of the LNT according to an average temperature of the LNT and the NOx purification efficiency of the SCR catalyst, and an effective volume of the LNT according to an aging factor of the LNT.

14. The exhaust purification system of claim 13, wherein the controller firstly corrects the target NOx adsorption in the LNT according to a ratio of a target NH3 adsorption in the SCR catalyst and an NH3 adsorption in the SCR catalyst, and secondly corrects the target NOx adsorption in the LNT according to a ratio of a NOx exhaust per unit distance and a target NOx exhaust per unit distance at a downstream of the SCR catalyst.

15. The exhaust purification system of claim 14, wherein the controller is configured to calculate the NOx exhaust per unit distance at the downstream of the SCR catalyst according to a NOx mass flow at the downstream of the SCR catalyst and a travel distance of a vehicle.

16. The exhaust purification system of claim 11, wherein the controller further determines whether a regeneration reset condition is satisfied and terminates the regeneration of the LNT when the regeneration reset condition is satisfied, and
wherein the regeneration reset condition is satisfied when first and second oxygen sensors mounted respectively at an upstream and a downstream of the LNT are synchronized or the NOx adsorption in the LNT is smaller than or equal to the target NOx adsorption in the LNT.

17. The exhaust purification system of claim 16, wherein the controller is configured to calculate the target NOx adsorption in the LNT according to the NOx purification efficiency of the SCR catalyst and an average temperature of the LNT.

18. The exhaust purification system of claim 11, wherein the controller further determines whether a regeneration reset condition is satisfied and terminates the regeneration of the LNT when the regeneration reset condition is satisfied, and
wherein the regeneration reset condition is satisfied when a regeneration signal of the LNT is output, an engine is operated at a normal mode for a predetermined period, a ratio of the NOx adsorption in the LNT to the threshold NOx adsorption in the LNT is smaller than a predetermined adsorption ratio, and a predicted regeneration period is shorter than a minimum period.

19. The exhaust purification system of claim 18, wherein the controller is configured to calculate the predicted regeneration period according to a sum of a mass of reductant reacting with NOx in the LNT and a mass of reductant reacting with O2 in the LNT, and a mass flow of reductant.

20. The exhaust purification system of claim 18, wherein the controller is configured to calculate the minimum period based on a vehicle speed and an average temperature of the LNT.

* * * * *